US006778978B1

(12) United States Patent
Lee

(10) Patent No.: US 6,778,978 B1
(45) Date of Patent: Aug. 17, 2004

(54) DETERMINING A WORKBASKET IDENTIFICATION FOR AN ITEM IN A DATA STORE

(75) Inventor: Thomas S. Lee, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 559 days.

(21) Appl. No.: 09/399,213

(22) Filed: Sep. 17, 1999

(51) Int. Cl.[7] ............................................. G06F 17/30
(52) U.S. Cl. ............................ 707/3; 707/10; 707/100
(58) Field of Search ...................... 707/1–10, 200–206, 707/100–104.1

(56) References Cited

U.S. PATENT DOCUMENTS

| | | | | |
|---|---|---|---|---|
| 5,596,750 A | * | 1/1997 | Li et al. | |
| 5,649,185 A | * | 7/1997 | Antognini et al. | 395/609 |
| 5,752,244 A | * | 5/1998 | Rose et al. | 707/5 |
| 5,764,980 A | * | 6/1998 | Davis et al. | 395/615 |
| 5,774,661 A | | 6/1998 | Chatterjee et al. | |
| 5,787,413 A | * | 7/1998 | Kauffman et al. | 707/2 |
| 5,845,067 A | * | 12/1998 | Porter et al. | 395/186 |
| 6,021,410 A | * | 2/2000 | Choy | 707/103 |
| 6,223,343 B1 | * | 4/2001 | Hopwood et al. | 717/11 |
| 6,256,636 B1 | * | 7/2001 | Choy | 707/103 |
| 6,260,040 B1 | * | 7/2001 | Kauffman et al. | 707/10 |

OTHER PUBLICATIONS

Billard, D., "Multipurpose Internet Shopping Basket;" Tjoa, A.M. and Wagner, R.R., Editors; Telecom & Operating Systems Group, Univ. de Geneve, Switzerland; Proceedings of the Ninth International Workshop on Database and Expert Systems Applications, pp. 685–690, Vienna, Austria, Aug. 26–28, 1998; IEEE Comput. Soc. (Abstract Only).

* cited by examiner

*Primary Examiner*—Jean M. Corrielus
*Assistant Examiner*—Joon Hwan Hwang

(57) ABSTRACT

A method, apparatus, and article of manufacture for executing a command in a computer to retrieve data from a data store connected to the computer. A request to identify a workbasket in which an item resides is received. Initially, it is determined whether the item resides in a workbasket. When it is determined that the item resides in a workbasket, a workbasket identification is returned.

42 Claims, 4 Drawing Sheets

DETERMINING A WORKBASKET IDENTIFICATION FOR AN ITEM IN A DATA STORE

BACKGROUND OF THE INVENTION

1. Field of the Invention

This invention relates in general to computer-implemented database management systems, and, in particular, to a technique for determining a workbasket identification for an item in a data store.

2. Description of Related Art

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries" (DL).

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

A workbasket is a term used to refer to a particular task within a series of tasks or workflow. An item can be any data object which has attributes. Workflow refers to a defined series of tasks within an organization to produce a final outcome. For example, one workflow system may enable defining workflow so that a document is routed from a writer to a proofreader to a printer. Workflow management is an essential element in today's enterprise data processing. An "enterprise" is a business organization that uses computers.

At any one time, access to an item in a multi-media database by a workflow process generally is limited to a single user or single workflow application, even though many workflow applications within the workflow process may require access to the same item. This is necessary because some tasks logically must precede or follow other tasks (e.g., a document can only be proofread after it has been written), and without the ability to determine where in the workflow process an item resides, the workflow applications must precede in a strict order.

However, having the ability to determine where in a workflow process a data item resides, would allow workflow processes to be run more efficiently by executing multiple tasks in parallel (i.e., multi-tasking) or without regard to a specific order. For example, as part of a document workflow system, a document must be cite checked and spell checked after the document has been written. A conventional workflow process would be limited to performing such tasks in a fixed sequential order, even though multi-tasking would be more efficient, because the workflow applications performing the cite check and spell check would not know whether the document is still being written.

Additionally, when an item is being updated as part of a task within the workflow process, the item is said to be checked out because it is unavailable for other workflow applications. Without knowing whether an item has been checked out, a user may invoke an application requiring the item only to find that the application returns an error because the item has been checked out by another workflow application and is not available. Thus, it is important for a user wishing to invoke an application within the workflow process to know whether the item has been checked out in addition to knowing in which workbasket, if any, the item resides.

Consequently, there is a need in the art for a technique for determining a workbasket identification for an item in a data store as well as determining whether an item has been checked out that solves the deficiencies mentioned above.

SUMMARY OF THE INVENTION

To overcome the limitations in the prior art described above, and to overcome other limitations that will become apparent upon reading and understanding the present specification, the present invention discloses a method, apparatus, and article of manufacture for a technique for determining a workbasket identification for an item in a data store as well as determining whether an item has been checked out.

In accordance with the present invention, a command is executed on a computer to retrieve data from a data store connected to the computer. Initially, a request is received to identify a workbasket in which an item resides. First, it is determined whether the item resides in a workbasket. When it is determined that the item resides in a workbasket, a workbasket identification is returned.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
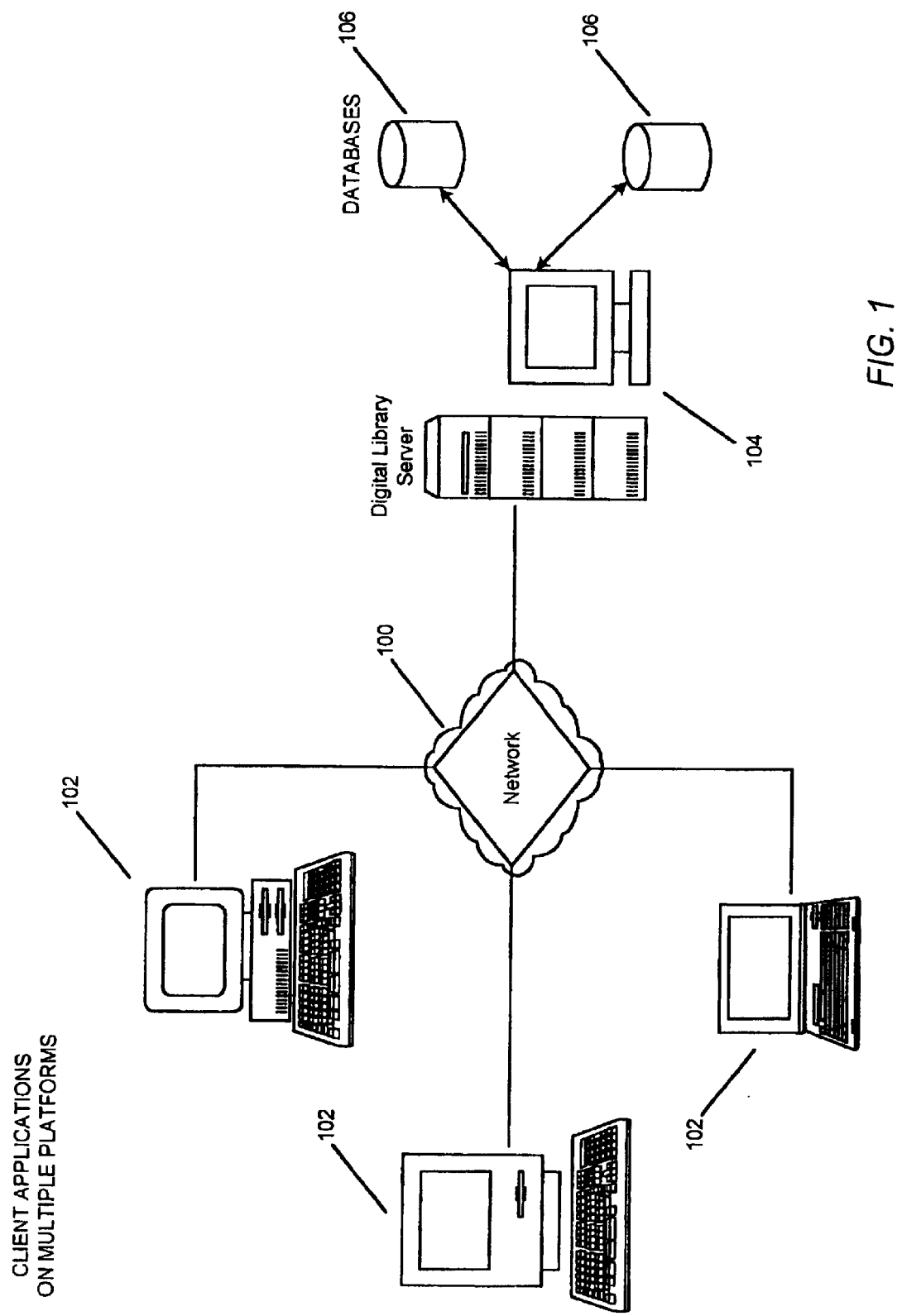
FIG. 1 schematically illustrates the hardware environment of a preferred embodiment of the present invention, and more particularly, illustrates a typical distributed computer system.

FIG. 1 schematically illustrates the hardware environment of a preferred embodiment of the present invention, and more particularly, illustrates a typical distributed computer system using the network 100 to connect client computers 102 executing client applications to a digital library server computer 104 executing software and other computer programs, and to connect the server system 104 to data sources 106. A data source 106 may comprise, for example, a multi-media database. A typical combination of resources may include client computers 102 that are personal computers or workstations, and a digital library server computer 104 that is a personal computer, workstation, minicomputer, or mainframe. These systems are coupled to one another by various networks, including LANs, WANs, SNA networks, and the Internet.

A client computer 102 typically executes a client application and is coupled to a digital library server computer 104 executing server software. The client application is typically a software program such as a workflow application. The server software is typically a program such as IBM's Digital Library or Visual Info server software. The Digital Library/Visual Info library server computer 104 also uses a data source interface and, possibly, other computer programs, for connecting to the data sources 106. The client computer 102 is bi-directionally coupled with the Digital Library/Visual Info library server computer 104 over a line or via a wireless system. In turn, the Digital Library/Visual Info library server computer 104 is bi-directionally coupled with data sources 106.

The data source interface may be connected to a Database Management System (DBMS), which supports access to a data source 106 by executing Relational Database Management System (RDBMS) software. The interface and DBMS may be located on the same server as the Digital Library/Visual Info library server computer 104 or may be located on a separate machine. The data sources 106 may be geographically distributed.

Those skilled in the art will recognize that the exemplary environment illustrated in FIG. 1 is not intended to limit the present invention. Indeed, those skilled in the art will recognize that other alternative system environments may be used without departing from the scope of the present invention.

Item Identification System

Figure 2:
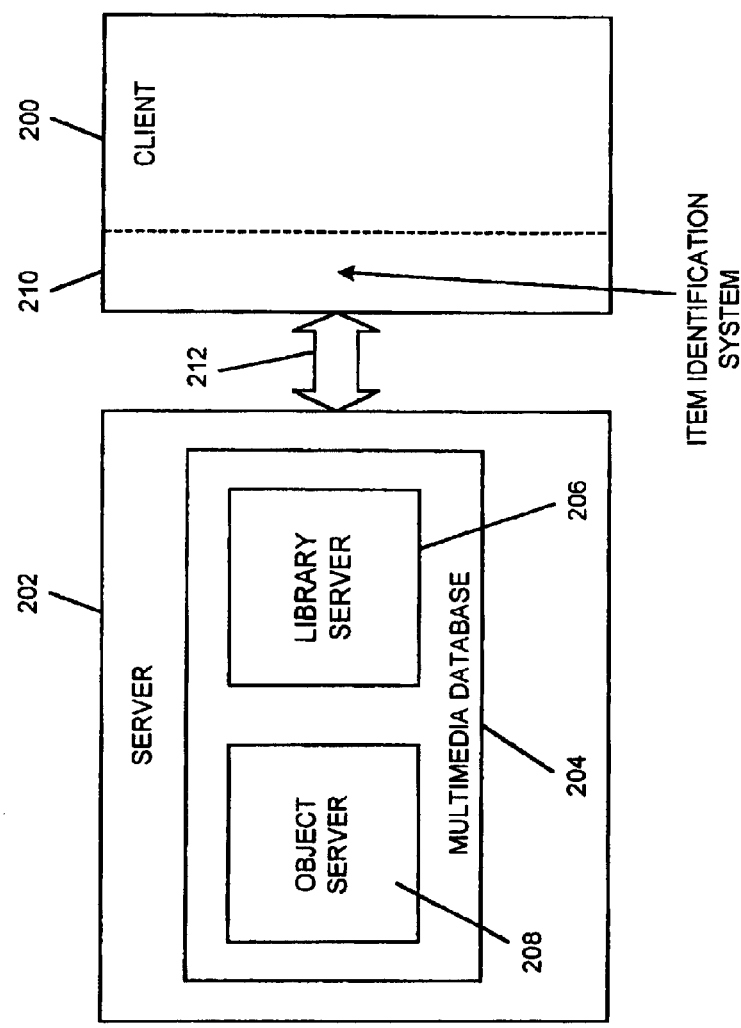
FIG. 2 is an exemplary block diagram illustrating an API to determine the identification of a workbasket for an item in a data store in a client/server system.

FIG. 2 is a block diagram illustrating one embodiment of the present invention for determining the identification of a workbasket for an item in a data store 204 in a client/server environment. In a preferred embodiment, an item identification system 210 resides at a client computer 200. The item identification system 210 retrieves data from a data store 204 operatively coupled to a server 202. The data retrieved indicates the workbasket identification and whether the item is checked out. In the present embodiment, the data store 204 is a multimedia database having an library server 206 and an object server 208. The client computer 200 and server computer 202 are coupled to one another by various networks 212, including LANs, WANs, SNA networks, and the Internet.

The present invention is generally implemented in the item identification system 210 as one or more computer programs, which execute under the control of an operating system on a client computer 200 and perform the desired functions as described herein.

The computer programs 210 are comprised of instructions which, when read and executed by the computer, cause the computer to perform the steps necessary to implement and/or use the present invention. Generally, the computer programs 210 are tangibly embodied in and/or readable from a device, carrier, or media, such as memory, data storage devices, and/or a remote device coupled to the computer via data communications devices. Under control of the operating system, the computer programs 210 may be loaded from the memory, data storage devices, and/or remote devices into the memory of the computer for use during actual operations.

Thus, the present invention may be implemented as a method, apparatus, or article of manufacture using standard programming and/or engineering techniques to produce software, firmware, hardware, or any combination therefore. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Figure 3:
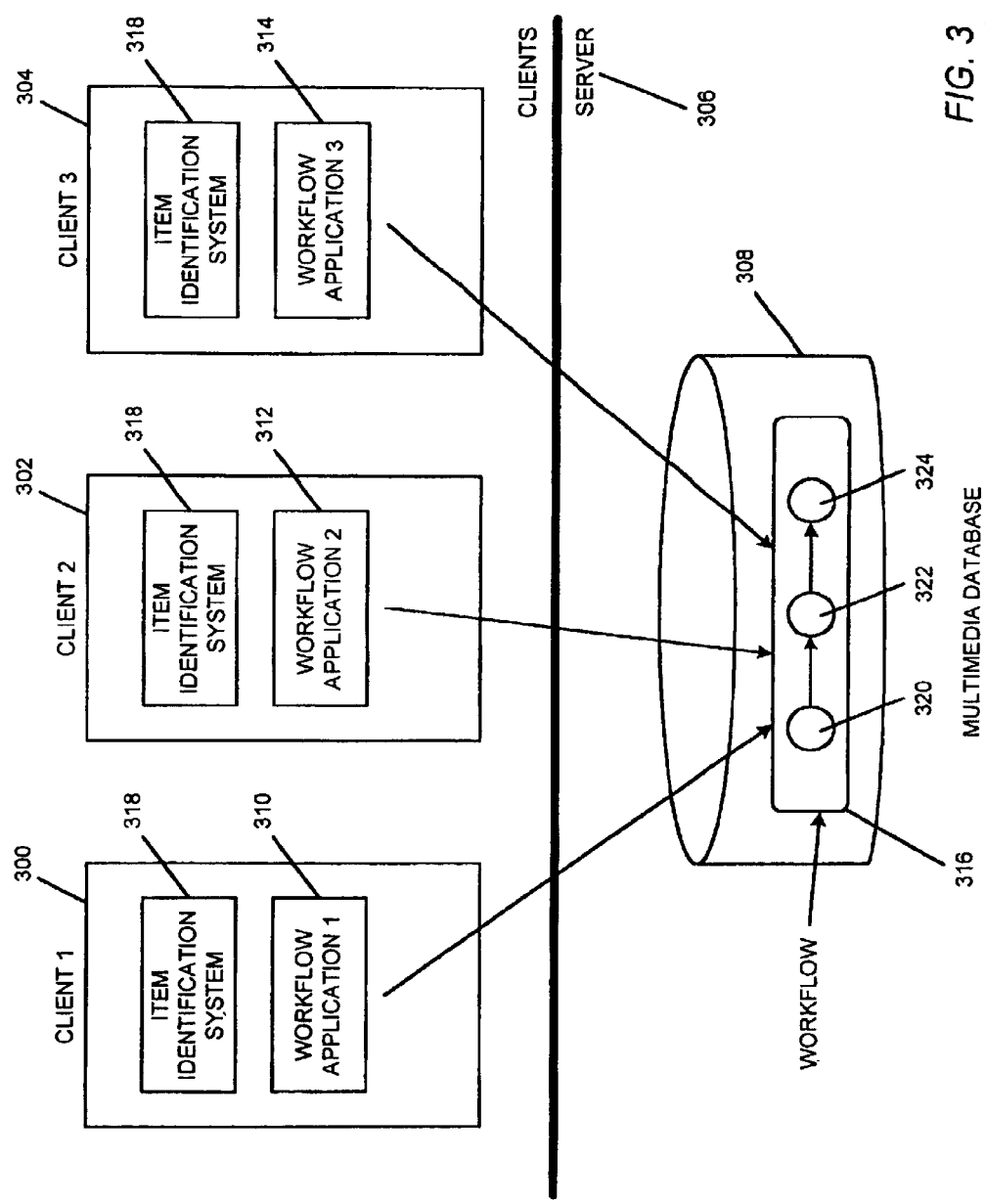
FIG. 3 is a block diagram illustrating an embodiment of the present invention with an example of a workflow in a client/server system.

FIG. 3 is a block diagram illustrating an embodiment of the present invention with a workflow process in a client/server environment. The clients are comprised of computers 300, 302 and 304 connected to a server 306 by a network. The server 306 comprises a multi-media database 308. Workflow applications 310, 312, and 314 are executing on client computers 300, 302 and 304, respectively.

The workflow 316 may be represented by a series of circles and arrows. Each circle in the workflow 316 may represent a workbasket 320, 322 or 324, which is a collection of items from the multimedia database 308. The arrows in the workflow 316 may represent the flow of direction of the work. In one embodiment, a user assigns an item from the multimedia database 308 to a workbasket 320, 322 or 324. Through a designated workflow 316, the item in a multi-media database 308 may be routed to different workbaskets 320, 322 or 324.

In a preferred embodiment, an item identification system 318 may execute on client computers 300, 302 and 304. In particular, initially the item identification system 318 receives a request to identify a workbasket in which a particular item resides. Additionally, the request may specify a plurality of items to determine for each item whether the item resides in a workbasket, and, if so, the workbasket identification. Further, the request may specify the number of items to be determined, a session handle, whether the process is synchronous or asynchronous and a return code structure for returning the workbasket identification and user who checked out the item, if any.

The following is an example API that may be used to submit a request to the item identification system 318:

"IP2FINDWBFORITEM (hSession, itemid, UlEntryCount, asyncCtl, pRC)". In this example, the input parameters are identified as follows:

| Input parameter | Description |
|---|---|
| hSession | session identification or handle |
| itemid | item identification |
| ulEntryCount | number of items to be searched |
| asyncCtl | synchronous or asynchronous process |
| pRC | return code structure for returning the workbasket identification and user who checked out the item, if any. |

When the API is invoked the item identification system 318 performs two functions: (1) determine the workbasket identification where an item resides; and (2) determine whether the item is checked out. First, the item identification system 318 determines whether the item resides in a workbasket. The item identification system 318 executes a query on the server 306 to search a table in a multi-media database 308. In one embodiment, the query can be a SQL statement such as "SELECT * FROM SBTWIPITEMS WHERE itemid=<value>". "SBTWIPITEMS" represents the particular table being searched. The item identification system 318 retrieves the <value>from the input parameters of the API. The table SBTWIPITEMS contains the items and its attributes, including an item identification, a workbasket identification identifying in which workbasket the item resides, and the user identification of the user, if any, who checked out the item. When the item identification system 318 determines that the item resides in a workbasket, the item identification system 318 returns a workbasket identification to the client computer executing the item identification system. When the item identification system 318 determines that the item is not in a workbasket, it returns an indication that the item is not in a workbasket.

For example, a workflow process for a document may be defined to include the tasks of writing the document, cite checking the document, spell checking the document and printing the document. The tasks of cite checking and spell checking the document can be done in any order or simultaneously, but can begin only after the document has been written. Previously, without the present invention, the cite checking and spell checking would be performed in a sequential manner even though such a rigid order is unnecessary. This results in a less efficient process. However, if users performing the cite check and spell check can verify that a document resides in a workbasket which follows the writing workbasket, then each user can begin a task without waiting for the other task to complete, provided that such tasks logically can be performed in parallel. Thus, if a user determines that the document in question resides in the spell check workbasket, the user can execute a workflow application to cite check the document without waiting for the spell check to complete.

Next, the item identification system 318 determines whether the item has been checked out by a user. Initially, the item identification system 318 determines whether the item is checked out to the client computer 300, 302 or 304 from which the item identification system 318 is executing. This determination can be performed by examining the local memory for any information about the item. When the item identification system 318 determines that the item is checked out by the user on the client computer 300, 302 or 304 from which the item identification system is executing, the item identification system returns an indication that the user on the client computer executing the item identification system has checked out the item. When the item identification system 318 determines that the item is not checked out by the user on the client computer 300, 302 or 304 from which the item identification system is executing, the item identification system executes a query on the server 306 to search a table in a multi-media database 308. In one embodiment, the query can be a SQL statement such as "SELECT * FROM SBTCHECKEDOUT WHERE itemid=<value>". "SBTCHECKEDOUT" represents the particular table being searched. The item identification system 318 retrieves the<value>from the input parameters of the API. The table SBTCHECKEDOUT contains the items and its attributes, including an item identification, a workbasket identification identifying in which workbasket the item resides, and the user identification of the user, if any, who checked out the item. When the item identification system 318 determines that the item is checked out, the item identification system returns the user identification of the user who checked out the item. When the item identification system 318 determines that the item is not checked out by any user, the item identification system returns an indication that the item is not checked out.

Referring to the workflow example above, a workflow process for a document is defined to include the tasks of writing the document, cite checking the document, spell checking the document and printing the document. As a rule, a user performing the task of printing the document can only print the document after it has been written. While a document is being written, it is checked out by the user writing the document. If a user invoked a workflow application to print the document while the document is being written, the user attempting to print the document will receive an error message generally indicating that the document is unavailable. In accordance with the present invention, a user desiring to print the document can determine if the document is checked out by a user by invoking the item identification system prior to attempting to print the document. In addition to determining the workbasket in which the document resides, the item identification system determines if the item has been checked out. Thus, the user attempting to print the document can determine if the document is available for printing before attempting to print the document, and thus avoid any error messages.

Figure 4:
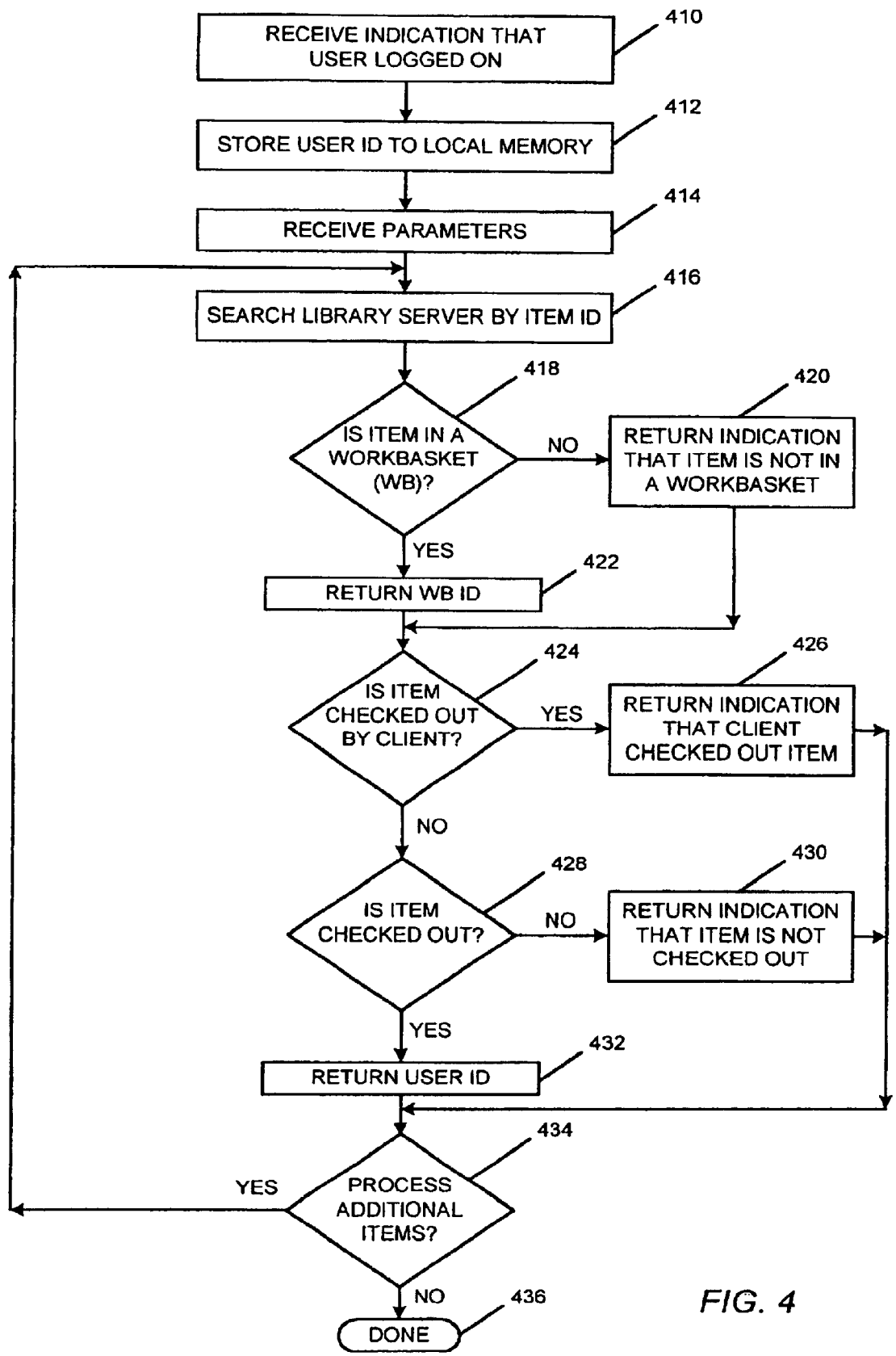
FIG. 4 is an exemplary flow diagram illustrating the steps performed by an API to determine the identification of a workbasket for an item in a data store.

FIG. 4 is an exemplary flow diagram illustrating the steps performed by an API to determine the identification of a workbasket for an item in a data store. In block 410, the item identification system residing on a computer receives an indication that the user has logged on to that computer. In block 412, the user identification is stored to memory local to the resident computer. In block 414, the item identification system receives input parameters. The input parameters comprise item identification(s), a number representing the number of items to be searched, a session handle, whether the process is synchronous or asynchronous, and a return code structure for returning the workbasket identification and user identification of the user, if any, who checked out the item. Using these input parameters, in block 416, the item identification system executes a command to search a data store by the item identification for the workbasket, if any, in which the item resides. The data store can be a multi-media database having a library server and an object server. In such an embodiment, the library server is searched by item identification. In block 418, the item identification system determines whether the item represented by the item identification resides in a workbasket. If the item resides in a workbasket, in block 422, the item identification system returns the workbasket identification. If the item does not reside in a workbasket, in block 420, the item identification system returns an indication that the item is not in the workbasket.

In block 424, the item identification system determines whether the item has been checked out by the user on the resident computer. A determination is made by comparing the item identification with the information stored locally on the resident computer. If the item has been checked out by the user on the resident computer, in block 426, the item identification system returns an indication that the user on the resident computer checked out the item. If the item has not been checked out by the user on the resident computer, in block 428, the item identification system determines if the item has been checked out by any user executing a query on the library server to search the multi-media database. If the item has not been checked out by any user, in block 430, the item identification system returns an indication that the item is not checked out. If the item has been checked out by a user, in block 432, the item identification system returns the user identification. Finally, in block 434, the item identification system determines whether there are additional items to process. If there are additional items to process, the item identification system loops back to block 416 to search the library server for the workbasket identification and user identification for each additional item.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a command in a computer to retrieve data from a data store connected to the computer, the method comprising:

receiving a request to identify a task within a series of tasks to which an item is associated;

determining whether the item is associated with said task; and returning an identifier of said task in response to determining that the item is associated with said task.

2. The method of claim 1, wherein said determining whether the item is associated with said task further comprises searching the data store by the item identification.

3. The method of claim 2, wherein the request specifies a plurality of items and wherein said determining whether the item is associated with said task determines for each item whether the item resides in a workbasket and whether the item has been checked out by a user.

4. The method of claim 3, wherein the request further comprises a session handle.

5. The method of claim 4, wherein the request further comprises whether a data communication process is synchronous or asynchronous.

6. The method of claim 5, wherein the request further comprises a return code structure.

7. The method of claim 6, wherein the request further comprises the number of items to be searched.

8. The method of claim 1, wherein the data store is a multimedia database.

9. The method of claim 1, wherein said identifier of task is an identifier of a workbasket.

10. The method of claim 9, further comprising:

determining whether the item is checked out by a user; and if it is determined that the item is checked out by a user, returning a user identification.

11. The method of claim 10, wherein the data store is connected to a server computer and the request is received from a first client computer.

12. The method of claim 11, wherein said determining whether the item is checked out by a user further comprises:

determining whether the item is checked out by a user on the first client computer; and if it is determined that the item is checked out by the user on the first client computer, returning an indication that the user on the first client computer checked out the item.

13. The method of claim 12, wherein said determining whether the item is checked out by a user further comprises:

if it is determined that the item is not checked out by the user on the first client computer, determining whether the item is checked out by a user other than the user on the first client computer; and if it is determined that the item has been checked out by the user on a computer other than the first client computer, returning a user identification.

14. The method of claim 1, wherein said series of tasks is a workflow.

15. An apparatus for executing a command in a computer to retrieve data from a data store connected to the computer in response to a request to identify a task among a series of tasks to which an item is associated, the apparatus comprising:

a processor;

a memory unit having recorded therein one or more computer programs suitable for execution by the processor for determining whether the item is associated with the task within the series of tasks, and returning an identifier if the item is associated with said task.

16. The apparatus of claim 15, wherein said one or more computer programs are further configured for determining whether the item is checked out by a user on the first client computer and if it is determined that the item is checked out by the user on the first client computer, returning an indication that the user on the first client computer checked out by the item.

17. The apparatus of claim 16, wherein said one or more computer programs are further configured for determining whether the item is checked out by a user other than the user on the first client computer if it is determined that the item is not checked out by the user on the first client computer, and returning a user identification if it is determined that the item has been checked out by a user on a computer other than the first client computer.

18. The apparatus of claim 15, wherein said one or more computer programs are further configured for searching the data store by the item identification.

19. The apparatus of claim 18, wherein the request specifies a plurality of items and wherein said determining whether the item is associated with a task determines for each item whether the item resides in a workbasket and whether the item has been checked out by a user.

20. The apparatus of claim 19, wherein the request further comprises a session handle.

21. The apparatus of claim 20, wherein the request further comprises whether a data communication process is synchronous or asynchronous.

22. The apparatus of claim 21, wherein the request further comprises a return code structure.

23. The apparatus of claim 22, wherein the request further comprises the number of items to be searched.

24. The apparatus of claim 23, wherein the data store is a multimedia database.

25. The apparatus of claim 15, wherein said identifier of said task is an identifier of a workbasket.

26. The apparatus of claim 25, wherein said one or more computer programs are further configured for determining whether the item is checked out by a user; and if it is determined that the item is checked out by a user, returning a user identification.

27. The apparatus of claim 26, wherein the data store is connected to a server computer and the request is received from a first client computer.

28. The apparatus of claim 15, wherein said series of tasks is a workflow.

29. An article of manufacture comprising a computer program carrier readable by a computer and embodying one or more instructions executable by the computer to retrieve data from a data store connected to the computer, the computer program comprising:

program instructions for receiving a request to identify a task within a series of tasks to which an item is associated;

program instructions for determining whether the item is associated with said task; and program instructions for returning a task identification if the item is associated with said task.

30. The article of manufacture of claim 29, wherein said determining whether the item is associated with the task further comprises searching the data store by the item identification.

31. The article of manufacture of claim 30, wherein the request specifies a plurality of items and wherein said determining whether the item is associated with the task determines for each item whether the item resides in a workbasket and whether the item has been checked out by a user.

32. The article of manufacture of claim 31, wherein the request further comprises a session handle.

33. The article of manufacture of claim 32, wherein the request further comprises whether a data communication process is synchronous or asynchronous.

34. The article of manufacture of claim 33, wherein the request further comprises a return code structure.

35. The article of manufacture of claim 34, wherein the request further comprises the number of items to be searched.

36. The article of manufacture of claim 35, wherein the data store is a multimedia database.

37. The article of manufacture of claim 29, wherein said identifier of said task is an identifier of a workbasket.

38. The article of manufacture of claim 37, wherein the computer program further comprises:

program instructions for determining whether the item is checked out by a user; and program instructions for returning a user identification if the item is checked out by a user.

39. The article of manufacture of claim 38, wherein the data store is connected to a server computer and the request is received from a first client computer.

40. The article of manufacture of claim 39, wherein said determining whether the item is checked out by a user further comprises:

determining whether the item is checked out by a user on the first client computer; and if it is determined that the item is checked out by the user on the first client computer, returning an indication that the user on the first client computer checked out the item.

41. The article of manufacture of claim 40, wherein said determining whether the item is checked out by a user further comprises:

if it is determined that the item is not checked out by the user on the first client computer, determining whether the item is checked out by a user other than the user on the first client computer; and if it is determined that the item has been checked out by a user on a computer other than the first client computer, returning a user identification.

42. The article of manufacture of claim 29, wherein said series of tasks is a workflow.

* * * * *